United States Patent
Ilnicki et al.

(10) Patent No.: US 7,336,673 B2
(45) Date of Patent: Feb. 26, 2008

(54) CREATING A LOW BANDWIDTH CHANNEL WITHIN A HIGH BANDWIDTH PACKET STREAM

(75) Inventors: Slawomir K. Ilnicki, Los Altos Hills, CA (US); Ajay Khoche, San Jose, CA (US); Gunter W. Steinbach, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 884 days.

(21) Appl. No.: 10/688,340

(22) Filed: Oct. 17, 2003

(65) Prior Publication Data

US 2005/0083957 A1    Apr. 21, 2005

(51) Int. Cl.
*H04L 12/56* (2006.01)
(52) U.S. Cl. .................. 370/412; 370/230; 370/366; 370/535
(58) Field of Classification Search .......... 370/230, 370/366; 714/715, 716, 798
See application file for complete search history.

(56) References Cited

U.S. PATENT DOCUMENTS

| | | | |
|---|---|---|---|
| 6,741,566 B1 | 5/2004 | Furlong et al. | |
| 7,089,485 B2* | 8/2006 | Azadet et al. | 714/798 |
| 7,111,208 B2* | 9/2006 | Hoang et al. | 714/716 |
| 7,127,648 B2* | 10/2006 | Jiang et al. | 714/715 |
| 2003/0061374 A1 | 3/2003 | Gregg | |
| 2004/0156314 A1* | 8/2004 | Lund et al. | 370/230 |

FOREIGN PATENT DOCUMENTS

| | | |
|---|---|---|
| GB | 2373671 | 9/2002 |
| WO | WO 01/56195 A2 | 1/2001 |

OTHER PUBLICATIONS

European Search Report dated Dec. 6, 2004.

* cited by examiner

*Primary Examiner*—Chi Pham
*Assistant Examiner*—Albert T. Chou

(57) ABSTRACT

Creating a low-bandwidth channel in a high-bandwidth channel. By taking advantage of extra bandwidth in a high-bandwidth channel, a low-bandwidth channel is created by inserting extra packets. When an inter-packet gap of the proper duration is detected, the extra packet is inserted and any incoming packets on the high-bandwidth channel are stored in an elastic buffer. Observing inter-packet gaps, minimal latency is introduced in the high-bandwidth channel when there is no extra packet in the process of being sent, and the effects of sending a packet on the low-bandwidth channel are absorbed and distributed among other passing traffic.

21 Claims, 11 Drawing Sheets

CREATING A LOW BANDWIDTH CHANNEL WITHIN A HIGH BANDWIDTH PACKET STREAM

BACKGROUND OF THE INVENTION

1. Field of the Invention

The present invention pertains to the art of packet-switched digital networks. More particularly, it pertains to injecting a low-bandwidth unidirectional data stream into a high-bandwidth channel.

2. Art Background

In many applications involving digital networks, there is a need for channels for management, monitoring, and/or measurement functions. In these functions, it is common to have a device connected to a high-bandwidth channel. The device performs some function, producing a low-bandwidth data stream as a result. Handling that low-bandwidth data stream requires that the device be connected to another communications channel, such as a wireless link, or a port on a high-speed switch. In devices such as switches and routers which have built-in measurement and management capabilities, additional resources are dedicated to providing communications capability to these functions. In either case, additional resources are tied up in the process of placing the low-bandwidth data stream back into the network.

SUMMARY OF THE INVENTION

A low-bandwidth channel is created in a high-bandwidth channel such that extra bandwidth is only used for the low-bandwidth channel when there is data to be sent, minimal latency is introduced in the high-bandwidth channel when there is no packet to be sent over the low-bandwidth channel, and the effects of sending a packet on the low-bandwidth channel are absorbed and distributed amongst other passing traffic.

BRIEF DESCRIPTION OF THE DRAWINGS

The present invention is described with respect to particular exemplary embodiments thereof and reference is made to the drawings in which.

DETAILED DESCRIPTION

Figure 1:
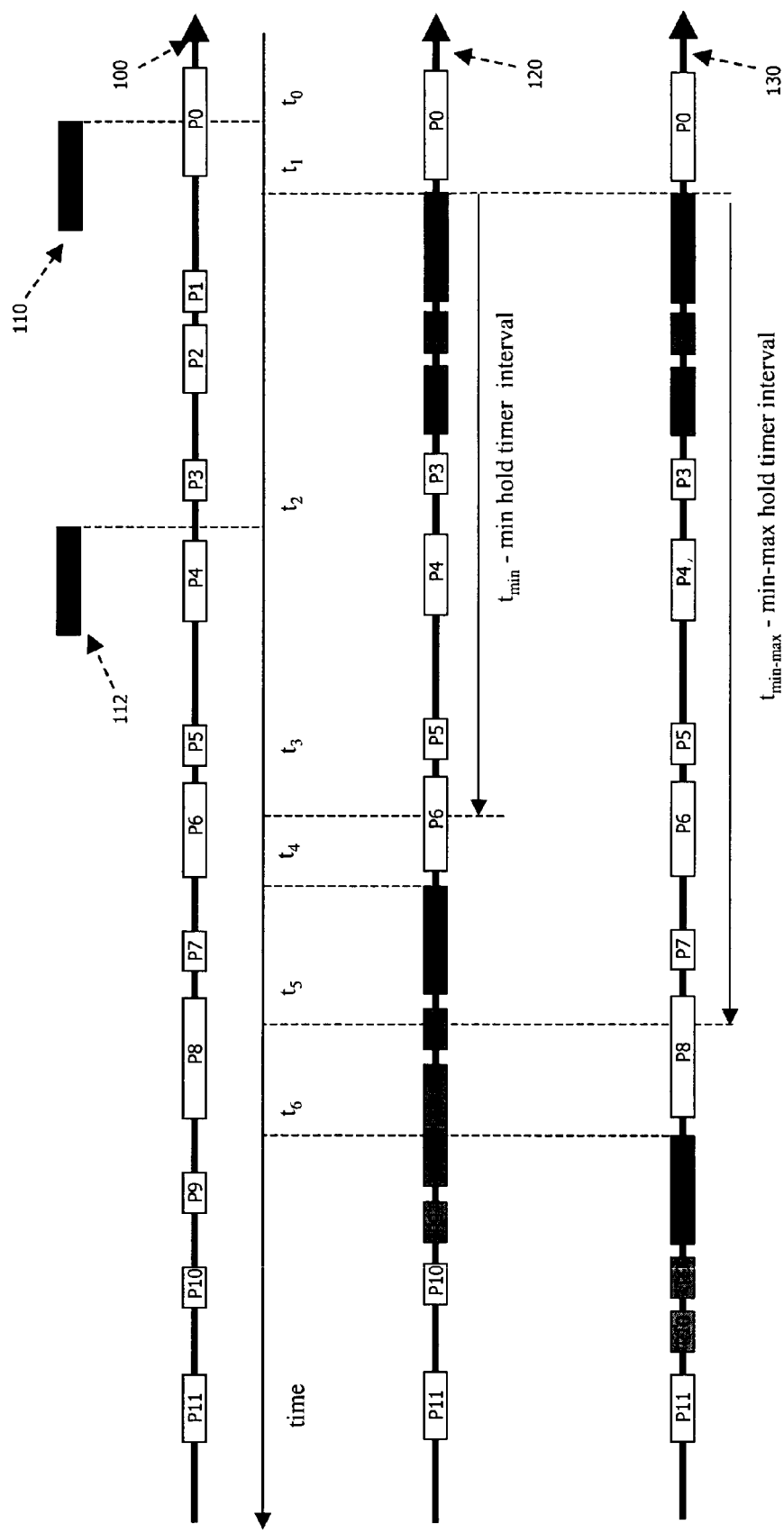
FIG. 1 shows packet insertion.

The present invention creates a low bandwidth channel by inserting packets into the high bandwidth packet stream. A low-bandwidth channel is created within the high-bandwidth channel by inserting packets at a predetermined interval. This insertion introduces latency into the high-bandwidth channel. This latency is not constant, but is recovered by minimizing inter-packet gaps between packets in the incoming high-bandwidth channel following the inserted packet. While the inserted packet is being transmitted, forming the low-bandwidth channel, arriving high-bandwidth packets are stored in an elastic buffer.

Considering the analogy of entering highway traffic, incoming traffic joins highway traffic by "squeezing in" (merging). If there is enough space between cars on the highway, there is no problem. However, during rush hour, joining traffic becomes more difficult. When we enter heavy traffic on the highway, cars that will end up behind us often must slow down to make room. This may however, not be noticeable for cars further behind. Traffic will compensate for entry by slowing down and making gaps between cars smaller because of lower speeds. In the old days, when there were no metering lights, such entries very often created havoc. By introducing metering lights, the situation improved in the sense that cars entered the highway at a predetermine frequency. This eased the impact of "injecting" cars into existing traffic. The present invention relies on sufficient under-utilized link capacity as packets are injected at a reasonably low rate.

Various Ethernet network studies have demonstrated that Ethernet networks work well if the bandwidth is utilized at no more than 30% of capacity. Heavier usage may cause collisions that lead to congestion. Retransmission may create more traffic and more collisions to the point that there will be very little traffic that makes it through. For backbone networks or inter-domain links, where there are fewer transmission originators, the traffic is much smoother, and the utilization of such links may reach 60-70% of capacity. There are fewer collisions because there are fewer parties competing at the switches where the traffic converges. Higher utilization and occasional traffic bursting may lead to substantial packets loss at the routers. While maximum packet size for basic Ethernet is 1536 bytes, typical traffic consists of a range of packet sizes. This means that a router's packet switching capabilities must match traffic patterns as well as link bandwidth. In other words, driving a communication line close to 100% of a router's capability, either in packets per second or link capacity, will result in substantial packet loss. The implications of packet loss are very severe. Packet loss may have an avalanche effect and may create even more traffic due to retransmissions. Therefore, most network planners leave a little slack, extra capacity, rather than running communication lines at 100% capacity. Some of this extra capacity is available for us as a low bandwidth channel as this invention proposes. This low bandwidth channel may use just 1% of the communication line total bandwidth.

The present invention defines the upper bandwidth of the low bandwidth channel by specifying a hold timer. The hold timer defines an interval during which only one packet may be sent. When the hold timer expires, another packet may be sent over the low bandwidth channel. This may only occur under the condition where the high bandwidth packet stream absorbed any previous packet that was inserted. In other words the high bandwidth packet stream must return to moving unaltered before an extra packet may be inserted into the stream. Of course, the extra packet insertion would cause small, temporary delays in the high bandwidth packet stream. The hold timer delay in clock cycles (characters; each transmitted character takes up one clock cycle) is calculated as follows:

$$\text{hold\_timer} = \text{packet\_in\_bytes} \times \frac{\text{high\_bandwidth\_channel\_speed}}{\text{low\_bandwidth\_channel\_speed}}$$

For example, if the inserted packet size is 1.5 Kbytes, the high bandwidth channel bandwidth is 1 Gbps, and the low bandwidth channel is 1% of the high bandwidth channel capacity, i.e., 10 Mbps, then the hold timer is approximately 150,000 clock cycles. The clock cycle per byte for 1 Gbps and with 8 B/10 B encoding of the bit stream is 10 nsec. This means, in this example, that no other packet could be introduced to the high bandwidth packet stream in less than 1.5 msec. Smaller packet sizes will have smaller hold timer values and could be introduced more often. However, choosing smaller packets may increase the number of packets per second which may affect the router's processing capability if it is near its packet-per-second limit.

Instead of defining the hold timer as a fixed function of packet size and bandwidth, the hold timer could have a random factor built in. In this case, the above calculated hold timer could be an average value that randomly fluctuates between a lower and upper bound. For example, the hold timer could be within +-20% of an average. Randomization of the hold timer may prevent synchronization of traffic flow when the same size packets are inserted into the traffic. It is not proven that randomization of this hold timer may affect flow synchronization but various studies of traffic flows have shown that synchronization in general may have an adverse effect on the overall stability of the networks.

Another important parameter is the inter-packet gap. This is a gap between two consecutive packets or frames (e.g., Ethernet frames). In 1 Gbps Ethernet, the minimum inter-packet gap must be 96 nsec. The only way to reduce the impact of insertion of an extra packet (actually a packet that is framed) into the high bandwidth stream is by reducing inter-packet gaps of following packets that are greater than the minimum. Of course, the minimum gap could be defined as larger than a minimum gap defined by a specific standard. This may be necessary if the line card has problems handling minimum gaps defined by the standard. Similarly to the hold timer, the minimum gap could also have a random factor built in to avoid possible harmful traffic synchronization. But a study has to be conducted to determine if that is necessary.

FIG. 1 illustrates how extra packets (frames) 110 and 112 are inserted into a high bandwidth packet stream 100. It should be repeated here that a "packet" is not just an IP packet but it is a frame that may contain an IP packet. In the case of Ethernet, it is an actual Ethernet frame that is already encoded e.g., using 8 B/10 B encoding. The type of encoding will depend on what type of encoding is used by passing traffic. In FIG. 1, unaffected packets are shown in clear, delayed packets in gray, and inserted extra packets in black.

At $t_0$ extra packet 110 is ready to be sent. By this time, the predetermined hold timer has expired. This means that the next opportunity to insert an extra packet will be when the high bandwidth channel will be transmitting IDLE characters. At $t_0$, packet P0 was being transmitted. After completion of transmitting P0 and minimum gap at $t_1$, new packet EP1 could be inserted. At the same time, the invention must absorb incoming traffic in an elastic buffer for future retransmission. In the example in FIG. 1., the incoming traffic between P0 and P1 has an inter-packet gap greater than the minimum. This invention will minimize this gap and drop extra IDLE characters until it sees packet P1. The P1 packet will enter the elastic buffer, as well as the minimum gap between P1 and P2 when the extra packet is in the process of being sent. Also, the gap between P2 and P3 will be reduced so that the P3 packet will move without delay. Only P1 and P2 are affected (delayed) by the insertion of the EP1 packet but P3 is not delayed. At $t_1$, the invention also starts a hold timer as defined earlier, shown as packet stream 120. Packet stream 130 illustrates a situation when a random factor is added to the hold timer. At $t_2$, another extra packet EP2 112 is ready to be sent. However, at this time, we have not yet met the low bandwidth channel criteria and must wait until $t_3$, when the hold timer expires. After $t_3$, the process repeats, i.e., at $t_4$ an extra packet is injected into the stream and so on. It should be noted here that the speed at which the new extra packets are absorbed would depend on the inter-packet gap sizes. Larger gaps will "absorb" new packets more quickly. Also it does not matter whether incoming traffic contains normal (1.5 Kbytes) or jumbo (9 Kbytes) Ethernet frames. However, bursted Ethernet frames will not be broken apart.

Figure 4:
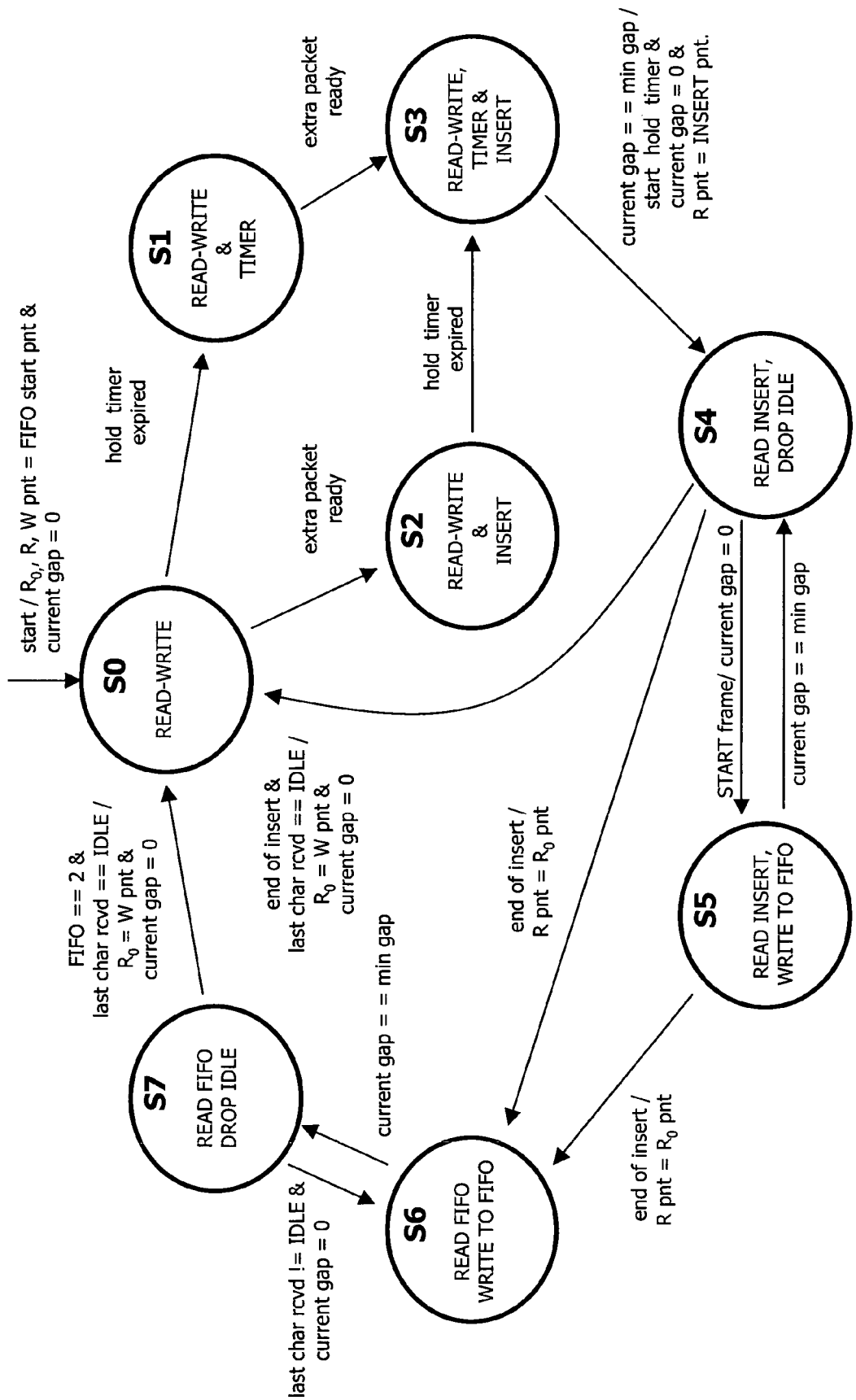
FIG. 4 shows a state machine suitable for the first embodiment of the invention.
Figure 5:
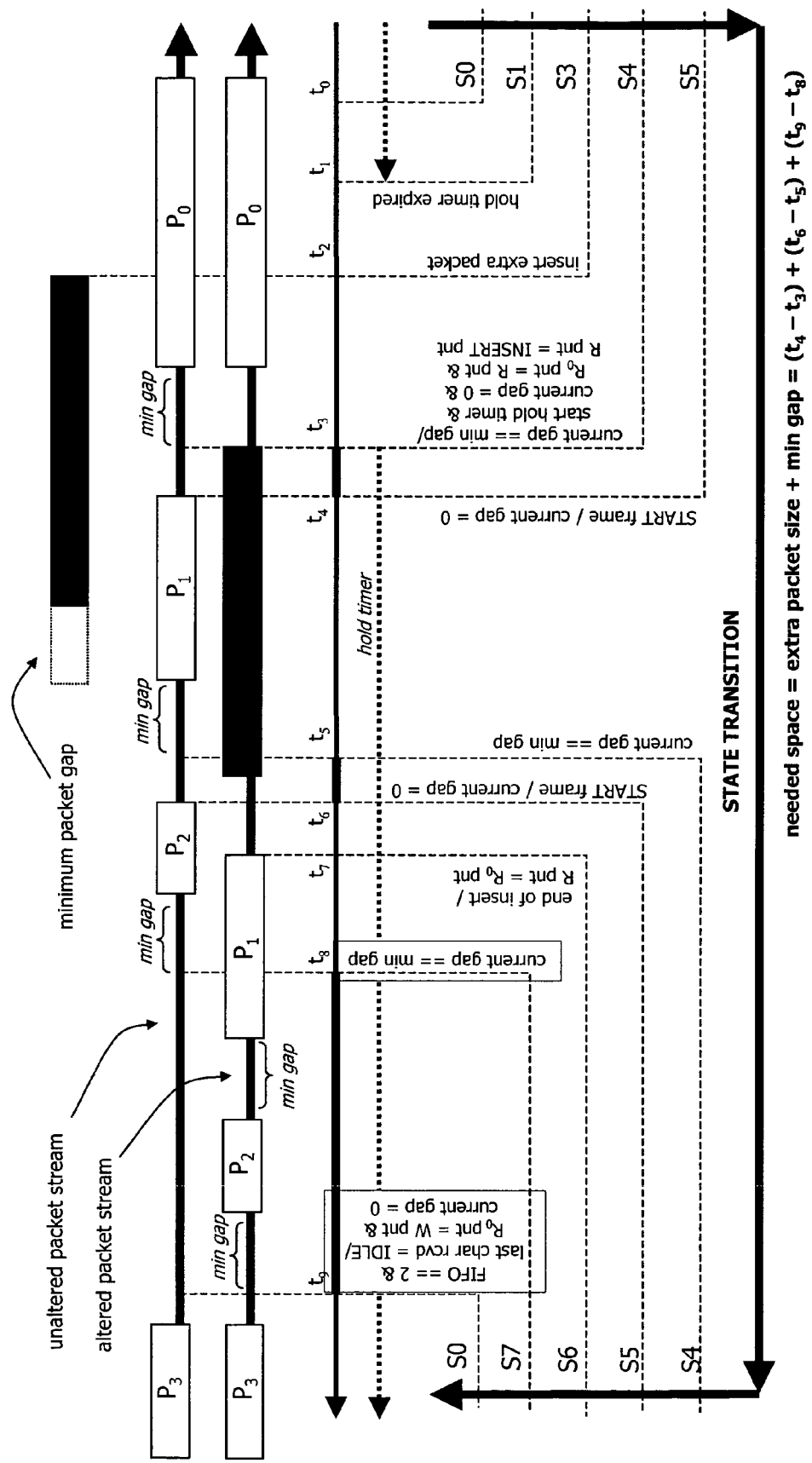
FIG. 5 shows state transitions in the first embodiment of the invention.
Figure 6:
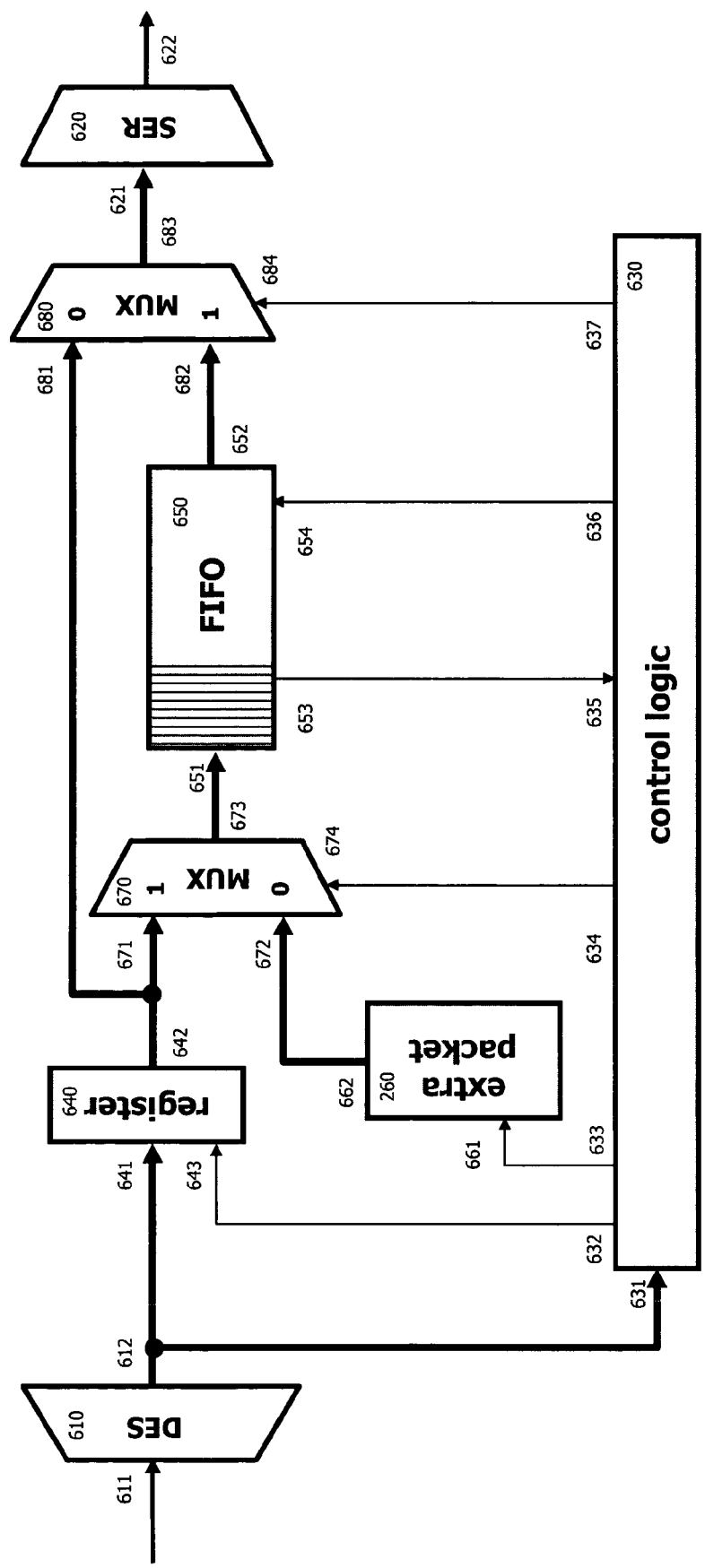
FIG. 6 shows a block diagram of a second embodiment of the invention.
Figure 7:
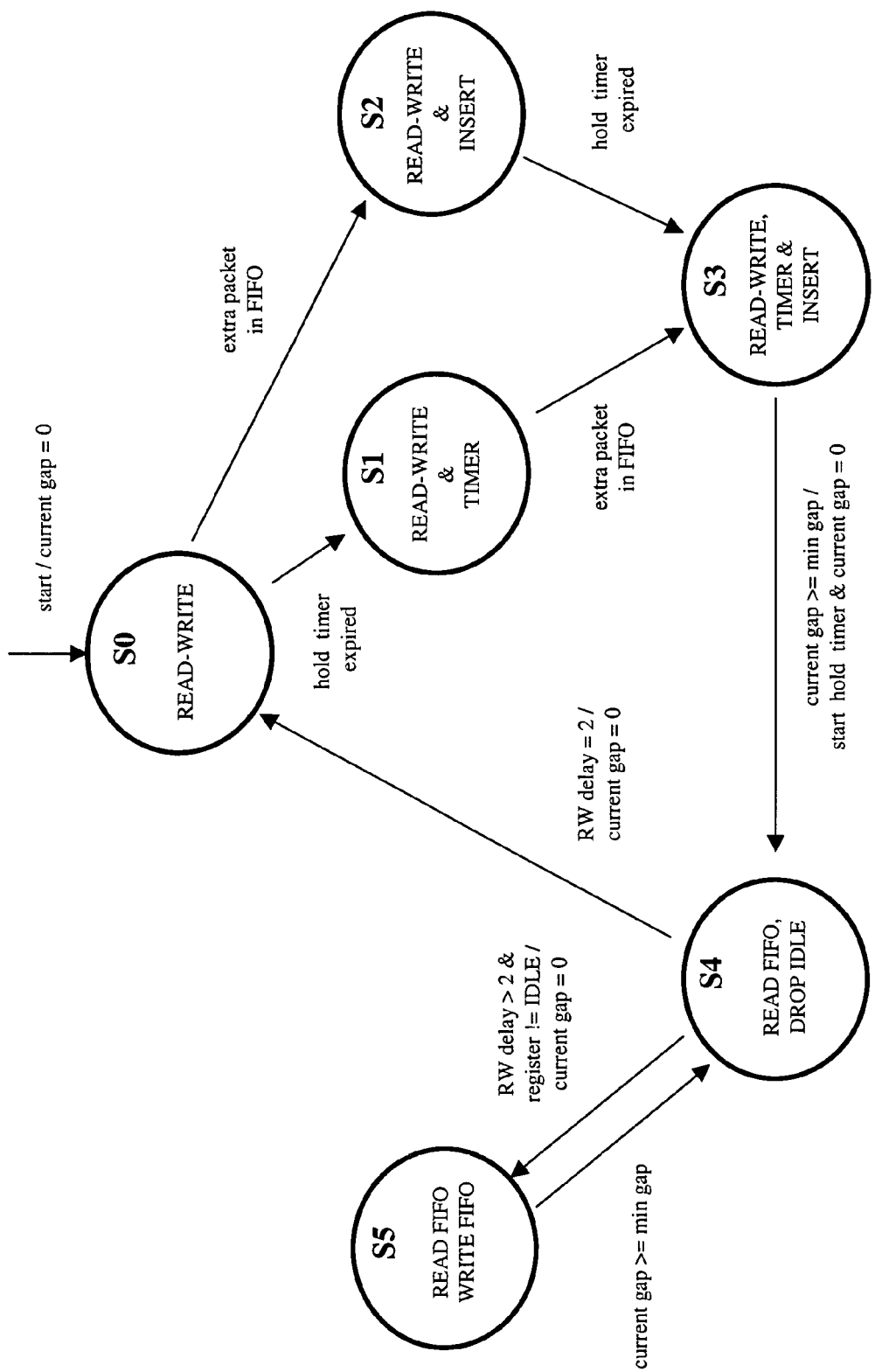
FIG. 7 shows a state machine suitable for the second embodiment of the invention.
Figure 8:
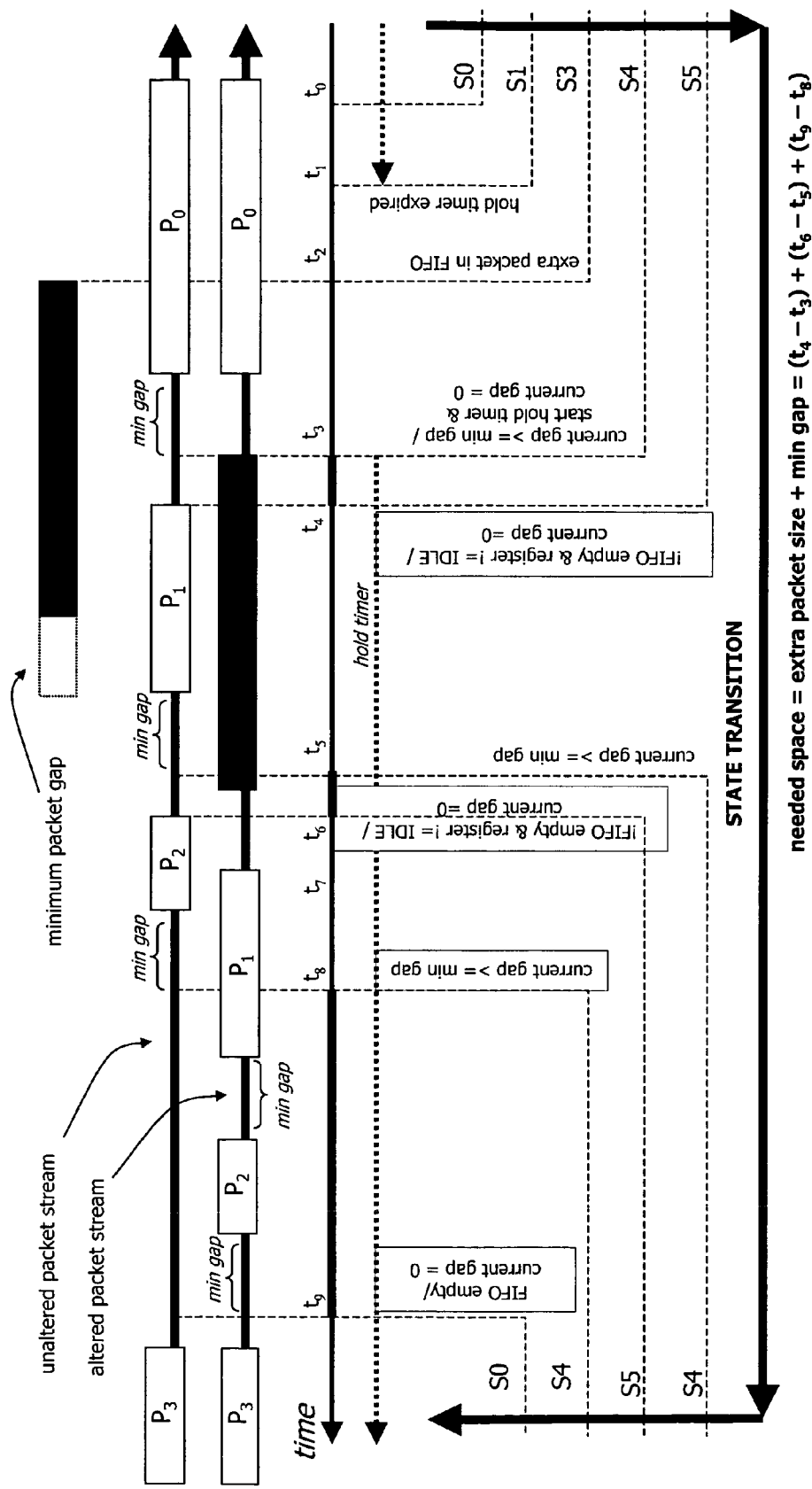
FIG. 8 shows state transitions for the second embodiment of the invention.
Figure 9:
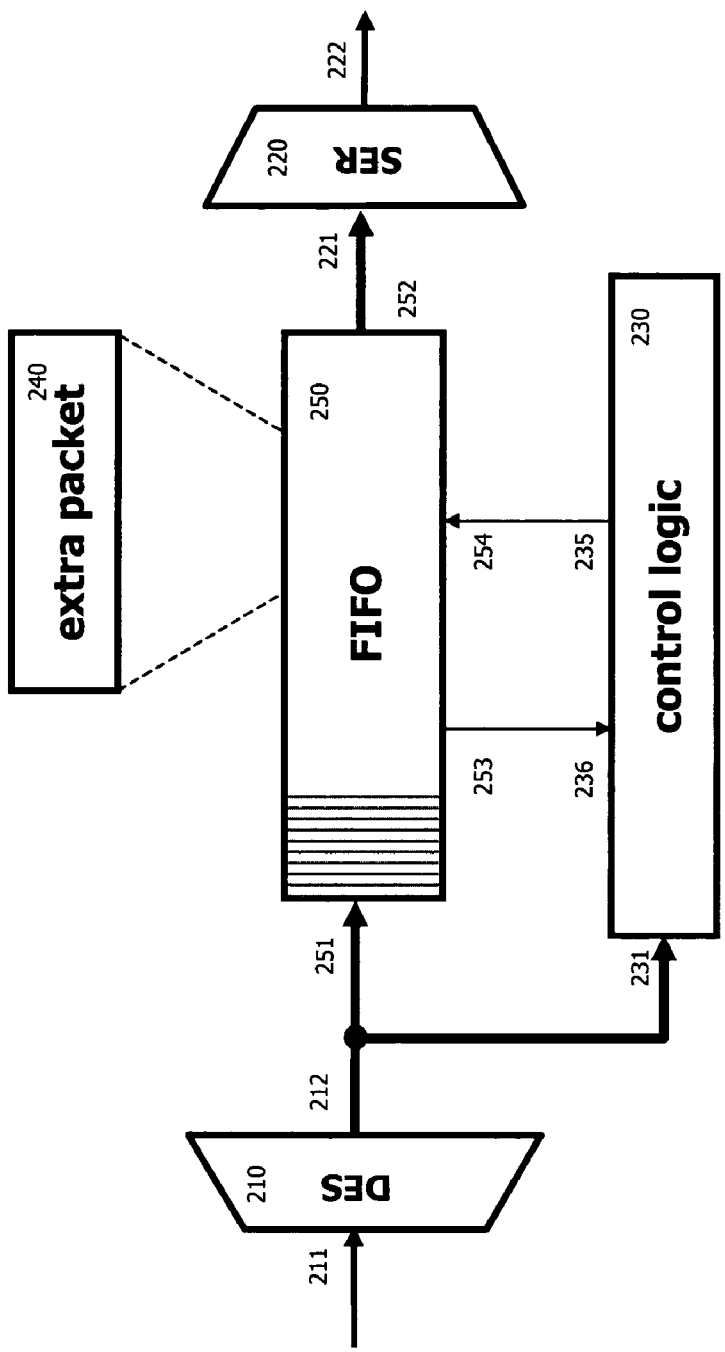
FIG. 9 shows a block diagram of a third embodiment of the invention.
Figure 10:
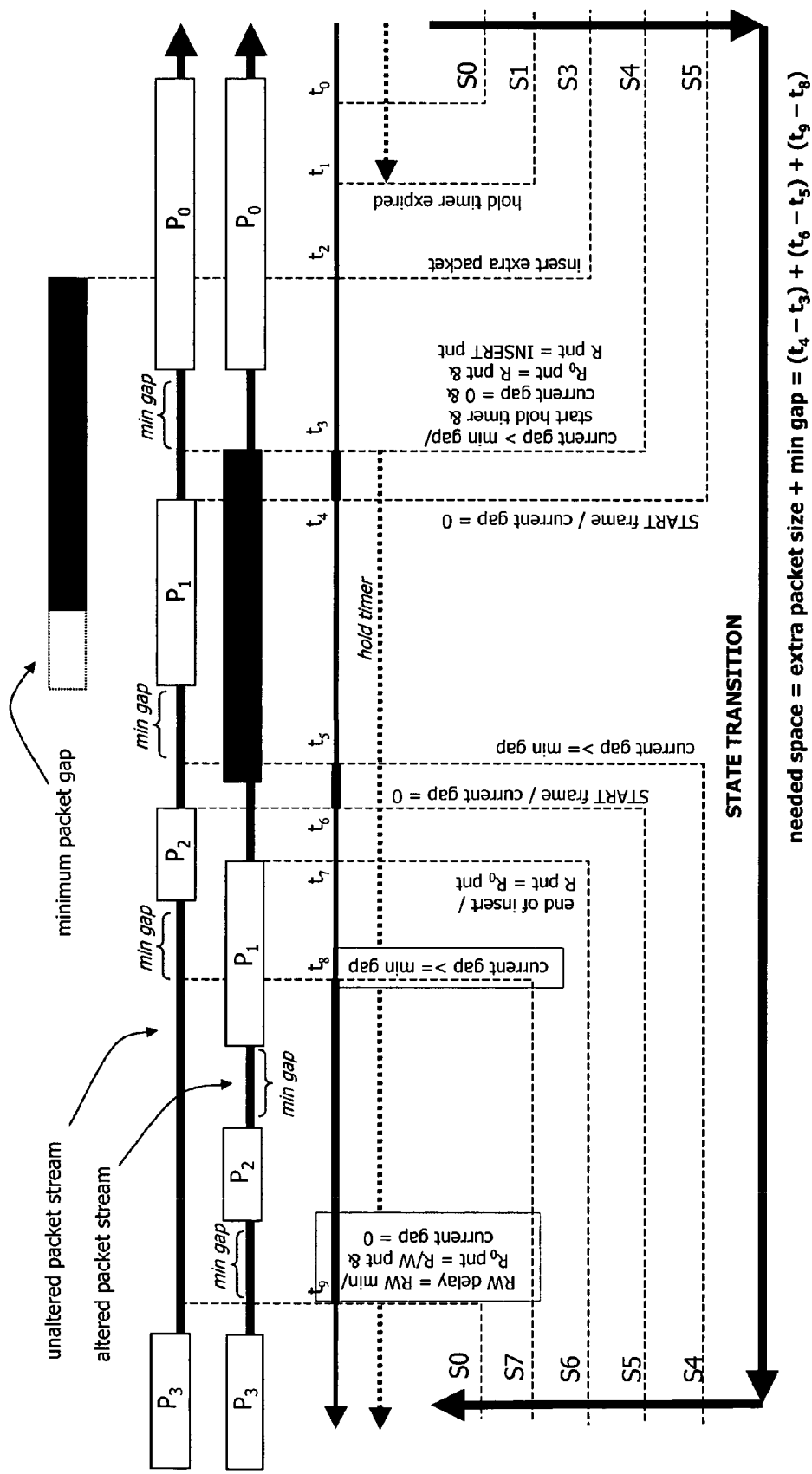
FIG. 10 shows state transitions for the third embodiment of the invention.
Figure 11:
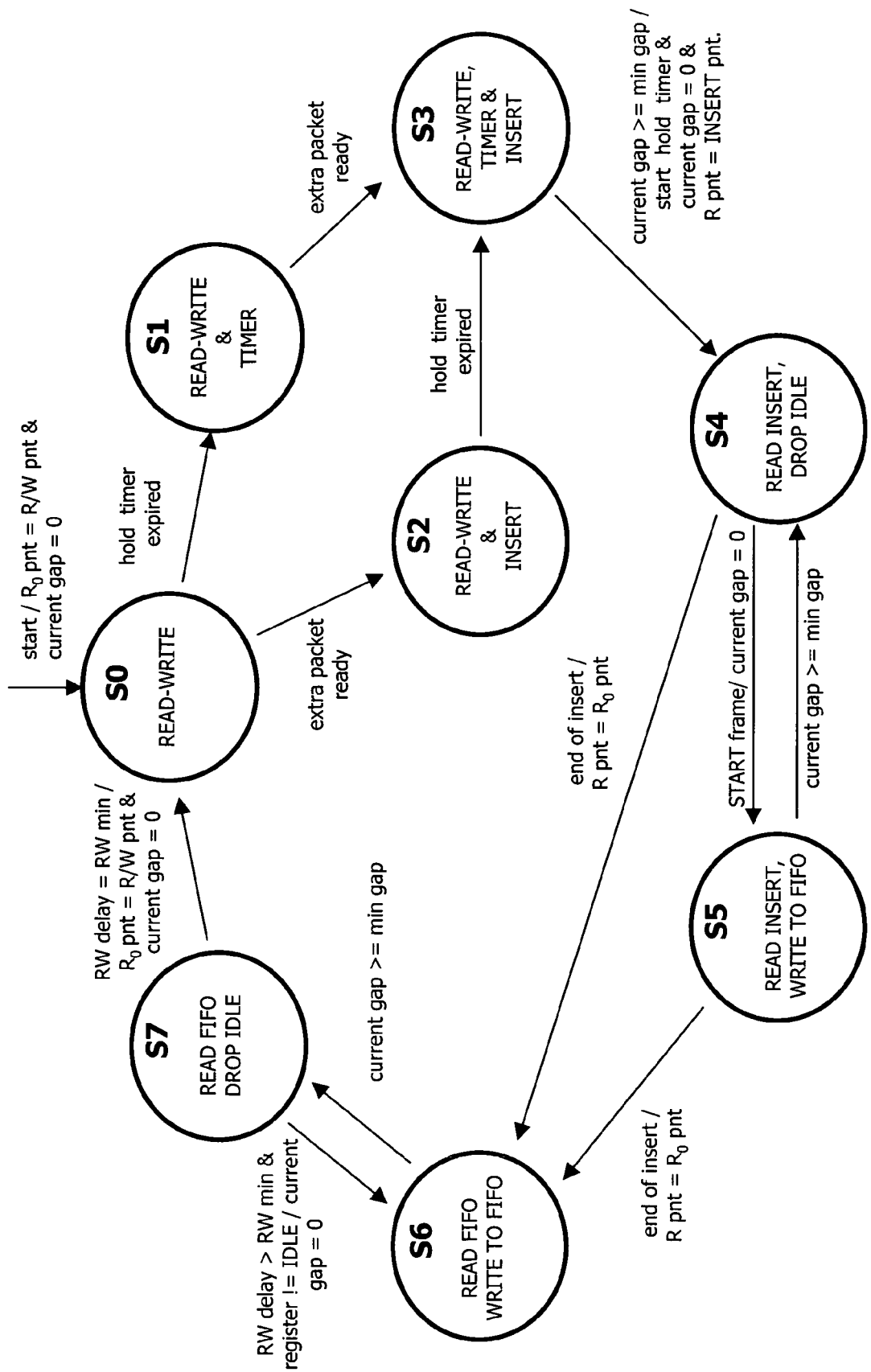
FIG. 11 shows a state machine suitable for the third embodiment of the invention.

A first embodiment of the present invention is shown in FIGS. 2 through 5; it introduces zero delay. A second embodiment of the present invention is shown in FIGS. 6 through 8 and uses a two-character delay. A third embodiment of the present invention is shown in FIGS. 9 through 11 and uses an arbitrary delay.

While the present invention may be implemented in various forms, the present invention is also suitable for implementation in a highly integrated form suitable for replacing industry-standard interface converter modules, for example those known as GBICs, or GigaBit Interface Converters. Current GBICs are basically transceivers translating one media type (optical, twisted pair, etc.) to another media type. By providing a replacement GBIC including the present invention, numerous applications requiring low-bandwidth channels are enabled. Such applications include many network monitoring applications.

Figure 2:
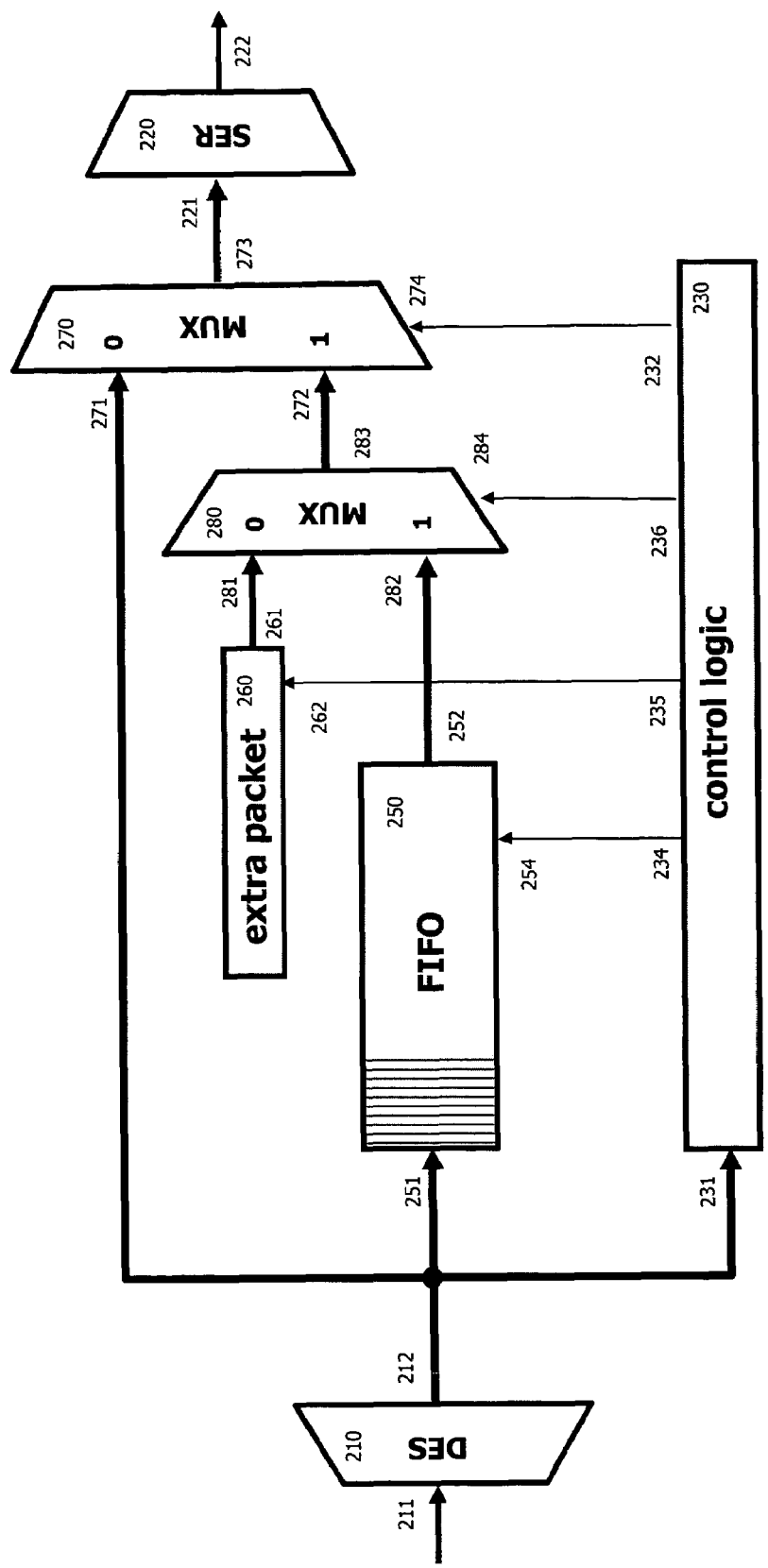
FIG. 2 shows a block diagram of a first embodiment of the invention.

The zero delay solution of FIGS. 2 through 5 operates normally at line speed (no latency introduced to traffic passing by except latency introduced by serializer, mux and deserializer). As shown in FIG. 2, Extra packets are injected into the traffic stream from buffer 260.

The two-character delay shown in FIGS. 6 through 8 introduces a minimum, two characters delay for normal operation (i.e., traffic passing by is delayed by two characters). As shown in FIG. 6, the extra packet is copied into FIFO buffer 650 before transmission.

The arbitrary delay solution of FIGS. 9 through 11 is important for those types of applications that require manipulation of data before forwarding, e.g., updating packet headers, removing parts of headers, etc.

While descriptions are included here to these representative embodiments, the main focus is on the zero delay solution that is described below in detail.

Any time a serial bit stream is de-serialized into parallel n-bit words, the result can only be forwarded for further processing (even just to re-serialize) after all n bits arrived. This means that de-serializing and then re-serializing a bit stream introduces a latency of at least one word cycle or n bits. In practice the serializer and the de-serializer each can be expected to have more than one bit times of internal latency, for a total of about two word cycles (20 ns for the Gigabit Ethernet example), even in the case of what we call the "zero-delay" solution. In addition, the invention must read and write to on-chip memory and detect idle characters at the word rate, e.g. 125 MHz for Gigabit Ethernet. This should not be a problem in a modern CMOS process. However, faster interfaces such as 10 Gb Ethernet, may require a wider, multi-word parallel stream which would incur additional SER/DES latency of 1 word cycle (n bits) per word. Of course, in absolute terms those cycles would be 10× faster.

Zero delay. FIGS. 2 through 5 show a zero delay (latency) embodiment of the current invention. Referring to FIG. 2, the incoming stream of packets comes in on interface 211. Because it is a serial stream of bits (for 1 Gigabit Ethernet, it runs an actual line rate of 1.25 Gbps) it is de-serialized by de-serializer 210 into parallel streams of bits. If 8 B/10 B encoding is used (e.g., 1 Gigabit/sec Ethernet) the stream will be de-serialized into a 10 parallel bit stream 212. That stream will go three different routes, depending the system state.

Figure 3:
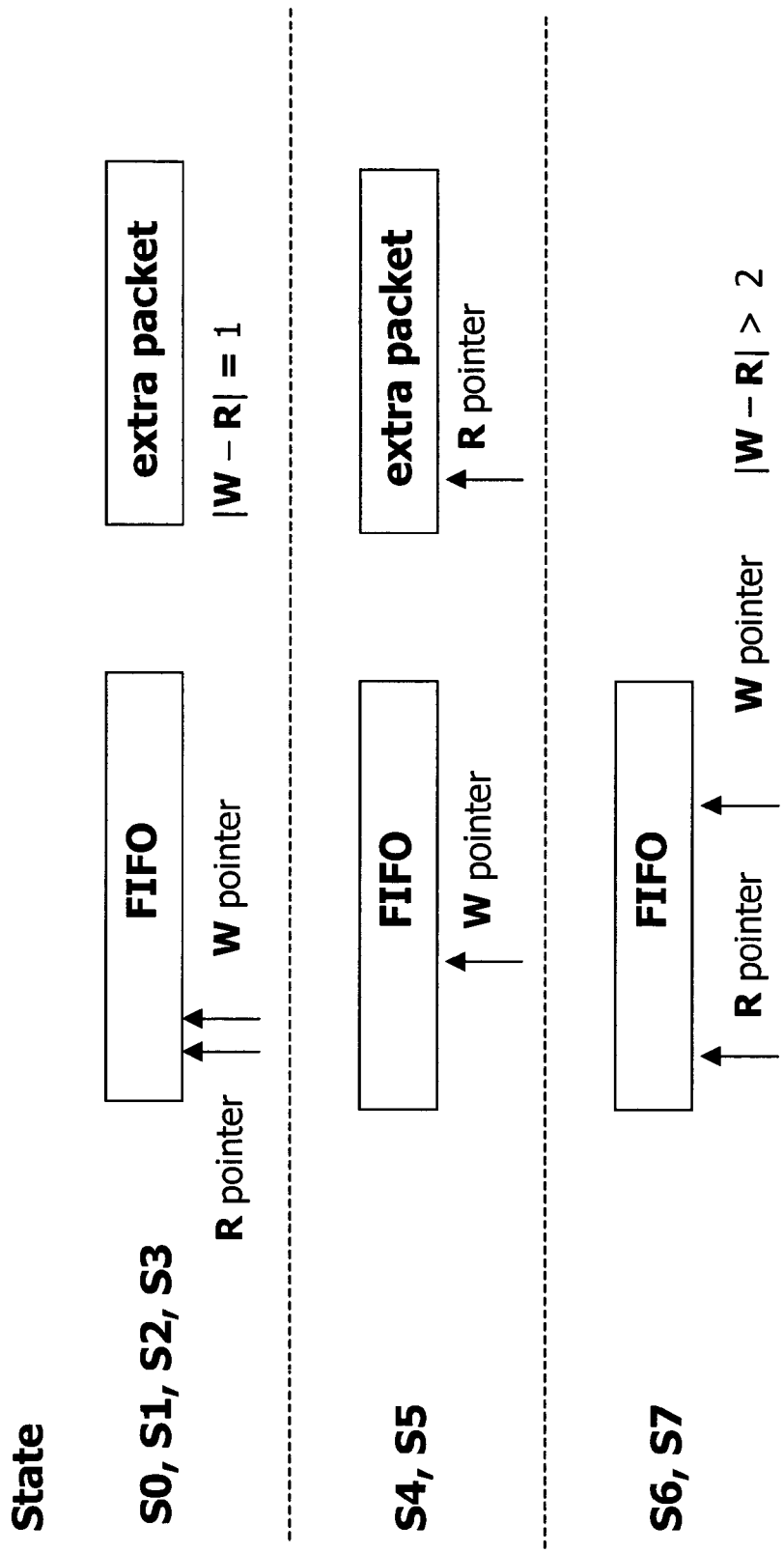
FIG. 3 shows FIFO pointers for the first embodiment of the invention.

De-serialization is a well-known technique to process high-speed data at lower speeds. For example in 1 Gigabit Ethernet data can be processed at 125 MHz instead of 1.25 GHz. If there is no other packet being sent or FIFO buffer 250 is empty (i.e., there is no effect of previously inserted packets on the main packet stream) the state of the control logic 230 is in the initial state—S0 of FIG. 4. The state machine described in FIG. 4 shows how control logic 230 transitions from one state to another based on events. FIG. 5 shows an example of a state transition. FIG. 2 illustrates the basic building blocks and FIG. 3 describes how FIFO buffer pointers transition.

It should be noted that while state machines are provided as an example and an aid to understanding the present invention, state machines are not necessary in practicing the invention. More compact embodiments may be obtained using fixed logic which implements the concepts described herein.

Similarly, while a FIFO is used as an example, any elastic buffer may be used. Hardware implementations may not require direct control of read and write pointers, for example, and single-port buffers may be used.

In state S0, the incoming packet stream data uses the "fast path". It moves from interface 212 to multiplexor MUX 270 through 271 interface. MUX 270 is in state 0 which allows the incoming data 271 to be forwarded through interface 273 and 221 to SERializer 220 which converts the parallel streams back into one serial stream 222 at the end. The output of SERializer 220 typically connects to outside network equipment, and may present an electrical or optical interface.

Referring to the example in FIG. 5, at time t0 an incoming packet P0 is passing through using the fast path described above. Control logic 230 is in state S0. At $t_1$, the hold time expires (FIG. 5) and control logic 230 moves from S0 to S1 state (event: hold timer expired; FIG. 4,5 ). At $t_2$, an extra packet (FIG. 5) is ready to be injected (event: extra packet ready) into the stream. The state machine of control logic 230 switches to state S3 (FIGS. 4 & 5 ). At this time the control logic 230 starts sensing when to inject the extra packet. The sensing is done by checking each individual character 231 passing through control logic 230.

The data can take 3 different paths after deserializer 212 of FIG. 2. The first path was described above as the fast path. The second path 251 goes into FIFO buffer 250. The third path 231 enters control logic 230. Control logic 230 senses IDLE characters indicating the possibility of injecting the extra packet. Control logic 230 counts IDLE characters to meet the minimum gap. This occurs in state S3 shown in FIGS. 4,5. Once the minimum gap is met, an event: current gap=minimum gap, is generated and the state machine switches to state S4 (insert packet into stream and start absorbing incoming traffic into FIFO). It should be noted here that in Gigabit Ethernet IDLE characters come from two different coding groups. In other word there are two different IDLEs. Which of the IDLEs to use will depend on DC signal balance of entire stream of sent characters. If for example an injected packet is followed by one type of IDLE and there are IDLEs in the FIFO that should follow immediately IDLEs of the inserted packet then those IDLEs should be replaced by the IDLE followed the inserted packet. This way proper DC signal balance will be preserved. In addition an IDLE is not a single character but two characters. At $t_3$ the extra packet 260 is being inserted. At the same time a new hold timer starts, the current gap counter is set to 0, FIFO 250 R (read) pointer is saved and a new R pointer points to the beginning of the extra packet (FIG. 3).

At the same time, the incoming packet data is also forwarded 251 to FIFO 250 but is not forwarded through MUX 280 because the state of MUX 280 is 0 and interface 282 only allows forwarding data if the state of MUX 280 is 1. Because the R pointer in this invention points to the extra packet the W (write) pointer will not advance at this time. The data will be written into FIFO 250 to the same location but reading will occur from the extra packet buffer.

It should be noted here that control logic 230 would change state S0→S2→S3 if event: extra packet ready occurs before event: hold timer expired (FIG. 4). Once those two events occur, control logic 230 will switch to state S4.

Once control logic 230 enters state S4 it sends a signal through interface 232-274 to change MUX 270 state to 1 and signal 236-284 to set MUX 280 to state 0. At the same time, through signal 235-262 it starts a process of sending the extra packet 260 character by character. At $t_3$, the R pointer is pointing to the extra packet data. Extra packet characters will move through interface 261-281 to MUX 280 and then they will be forwarded through interface 283-272 to MUX 270. Because MUX 270 is in state 1, data goes through interface 273-221 to SERializer 220 and leaves thorough interface 222. At t4 packet P1 arrives. An event: START frame will be generated and control logic 230 will transition to state S5. FIFO 250 starts accumulating P1 characters, i.e. its W pointer starts advancing. This means also that a gap $t_3$-$t_4$ was eliminated from the stream of packets to compensate for the effect of the extra packet insertion on the incoming packet stream delay. In the example shown in FIG. 5, this gap ($t_3$-$t_4$) is not sufficient to completely absorb the effect of the newly inserted extra packet and more inter-packet gaps must be used to compensate the effect.

It should be noted here that the transition to the next state, e.g. from S3→S4 or S5→S4 will only occur if the configured minimum gap is met. In other words, for example a packet could not be inserted after P0 if the actual minimum gap (as defined by the standard) between P0 and P1 is less than configured minimum gap. The extra packet will have to wait until a large enough inter-packet gap will show up. This option of having a configurable minimum gap larger than those defined by a specific standard is left for those deployments where standard defined minimum gap puts too much stress on the receiving end. It is assumed that under normal circumstances the configurable minimum gap will be equal to that defined by the standard. For brevity in this document any time this invention is referring to minimum gap is referring to configurable minimum gap.

The extra packet must be trailed by at least the minimum gap. The gap between packets P0 and P1 is too small to accommodate the trailing gap for the inserted extra packet and therefore a minimum gap has to be included as part of the extra packet. The absorption of the effect of the insertion of extra packet ($t_3$-$t_4$) is done simply by FIFO 250 not advancing its own W pointer.

Once packet P1 is absorbed by FIFO 250, the FIFO will accept IDLE characters following P1 only until the minimum gap trailing P1 is met at $t_5$. At $t_5$ an event: current gap==min gap is generated and control logic (230) will transition back to state S4 to eliminated extra IDLE characters. FIFO (250) will skip IDLE characters until the arrival of a new packet P2 ($t_6$). Again, here the gap $t_5$-$t_6$ is used to compensate the effect of the extra packet insertion. At $t_6$ a new packet P2 arrives and an event: START frame is generated. This event transitions control logic (230) state machine to state S5 in which the FIFO is going to save incoming packets for future transmission.

At time $t_7$ the extra packet with minimum gap is finally sent. Control logic 230 switches through 236-284 interface MUX 280 to state 1 and sets R pointer to the beginning of FIFO 250 (FIG. 3, State S6, S7). An event: end of insert is generated and the state machine of control logic 230 transition to state S6. At this time, data is being sent from FIFO 250. The FIFO's R pointer is set to a first character and this will be the first character of packet P1 saved in FIFO. In the mean time, FIFO 250 is accepting 251 and storing packet P2. At $t_8$ minimum gap trailing packet P2 is reached. An event: current gap==minimum gap is generated and state machine transition to state S7 (skip IDLE characters while emptying FIFO).

At time $t_9$ the last character from FIFO 250 is sent. It should be noted this is not the actual last character saved in the FIFO. The last character means a character that could be read from FIFO. The R pointer is, at this time, two characters behind the W pointer. Because we were receiving IDLE characters after the minimum gap was reached, the W pointer has not been advancing. In other words, IDLE characters between $t_8$ and $t_9$ were intentionally dropped from the incoming packet stream. If at $t_9$, the last two received characters were representing IDLE then, in the next clock cycle (next character) it will be safe to switch to the fast path. The only thing, which could be lost from the incoming packet stream, is this IDLE (i.e., two characters representing one IDLE). And that is OK, it is actually what we want. In this case, events: FIFO==2 and last char rcvd==IDLE are generated and the control logic state machine goes back to state S0 (fast path). Control logic 230 via interface 232-274 switches MUX 270 to state 0 and allows the packet stream to follow the fast path (212-271-273-221-222).

As shown packet P3 arrives after $t_9$. However, if by coincidence, the last received character was the start frame character of packet P3, then we have no choice but to stay in the FIFO path until the inter-packet gap is long enough (minimum gap plus two extra characters representing one IDLE) to allow us to switch to the fast path. This is a very crucial element of the invention. Switching from FIFO path to fast path can only occur when two characters representing an IDLE that were received but not yet sent can be dropped. And the only characters that can be dropped are IDLEs (two characters each), assuming of course, that the minimum gap was already sent. By its nature, the FIFO path is always at least two characters behind the fast path, i.e., R pointer follows W pointer by no less than two characters.

Two-character delay. A embodiment of the present invention using a two-character delay (size of an IDLE) is shown in FIGS. 6 through 8. As shown in FIG. 6, this embodiment uses register 640 in the path whose output 642 is fed either to FIFO 650 or leaves the logic through MUX 680 and SERializer 620. The difference between this embodiment and the zero-delay embodiment is twofold. In the fast path of this embodiment, register 640 introduces a permanent two-character delay and the extra packet is not injected into the packet stream from a separate memory but instead is copied to FIFO 650 first. This may simplify implementation of the memory controller and management of FIFO 650. FIGS. 6 through 8 illustrate the block diagram, suitable state machine, and example state transitions for this embodiment.

Arbitrary delay solution. An embodiment of the present invention using an arbitrary delay solution is a simplified version of zero delay without an option of zero delay. FIGS. 9 through 11 illustrate this embodiment, which is applicable for applications that require delays. For example, manipulation of IP headers or when entire packet will require withhold before releasing and modifying information in the packet header. It is, in concept, similar to store and forward techniques used by packet switches. Both the extra packet 240 and the packet stream 211 are stored in FIFO 250 and selectively routed to SERializer220 under control of a state machine according to FIG. 11.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. Apparatus for creating a low-bandwidth channel in a high bandwidth channel comprising:
    a deserializer converting a serial high bandwidth channel from a serial datastream to an output high bandwidth parallel datastream,
    memory holding an extra packet for the low-bandwidth channel,
    memory holding the high bandwidth parallel datastream while the packet for the low-bandwidth channel is being sent,
    a serializer converting a parallel datastream to a serial datastream, and
    control logic accepting the high bandwidth parallel datastream, the control logic routing the high bandwidth parallel datastream to the serializer when the extra packet is not being transmitted and routing the output of the memory holding the extra packet to the serializer while transmitting the extra packet forming the low bandwidth channel.

2. The apparatus of claim 1 where the control logic uses a state machine.

3. The apparatus of claim 1 where the memory holding the high bandwidth parallel datastream is organized as a first-in-first-out memory.

4. Apparatus for creating a low-bandwidth channel in a high bandwidth channel comprising:
    a deserializer converting a serial high bandwidth channel from a serial datastream to an output high bandwidth parallel datastream,
    memory holding an extra packet for the low-bandwidth channel,
    memory holding the high bandwidth parallel datastream while the packet for the low-bandwidth channel is being sent,
    a serializer converting a parallel datastream to a serial datastream, and control logic accepting the high bandwidth parallel datastream, the control logic routing the high bandwidth parallel datastream to the serializer when the extra packet is not being transmitted and routing the output of the memory holding the extra packet to the serializer while transmitting the extra packet forming the low bandwidth channel, where the control logic includes:
a first multiplexer selecting between the output of the extra packet memory and the output of the first-in-first-out memory,
a second multiplexer selecting between the output of the deserializer and the output of the first multiplexer, the output of the second multiplexer feeding the serializer.

5. Apparatus for creating a low-bandwidth channel in a high bandwidth channel comprising:
a deserializer converting a serial high bandwidth channel from a serial datastream to an output high bandwidth parallel datastream.
memory holding an extra packet for the low-bandwidth channel,
memory holding the high bandwidth parallel datastream while the packet for the low-bandwidth channel is being sent, where the memory holding the high bandwidth parallel datastream is organized as a first-in-first-out memory;
a serializer converting a parallel datastream to a serial datastream,
control logic accepting the high bandwidth parallel datastream, the control logic routing the high bandwidth parallel datastream to the serializer when the extra packet is not being transmitted and routing the output of the memory holding the extra packet to the serializer while transmitting the extra packet forming the low bandwidth channel;
a register controlled by the control logic, the input of the register connected to the deserializer output,
a first multiplexer controlled by the control logic, the first multiplexer selecting between the memory holding the extra packet and the register output,
the output of the first multiplexer feeding the first-in-first-out memory,
and a second multiplexer controlled by the control logic, the second multiplexer selecting between the output of the register and the output of the first-in-first-out memory,
the output of the second multiplexer feeding the serializer.

6. The apparatus of claim 3 where the memory holding the extra packet for the low-bandwidth channel is a portion of the first-in-first-out memory.

7. The apparatus of claim 1 where the serializer has an optical output.

8. The apparatus of claim 1 where the serializer has an electrical output.

9. A method of creating a low-bandwidth channel in a high-bandwidth channel comprising:
converting the high-bandwidth serial channel to a high bandwidth parallel datastream,
holding an extra packet for the low-bandwidth channel in a memory,
capturing the high bandwidth parallel datastream in a memory while the packet for the low bandwidth channel is being sent, and
selecting under control of a state machine either the high bandwidth parallel datastream or the extra packet in the low bandwidth channel memory for conversion from parallel to serial form.

10. The method of claim 9 where the conversion from parallel to serial form produces an optical output.

11. The method of claim 9 where the conversion from parallel to serial form produces an electrical output.

12. The apparatus of claim 4 where the control logic uses a state machine.

13. The apparatus of claim 4 where the memory holding the high bandwidth parallel datastream is organized as a first-in-first-out memory.

14. The apparatus of claim 13 where the memory holding the extra packet for the low-bandwidth channel is a portion of the first-in-first-out memory.

15. The apparatus of claim 4 where the serializer has an optical output.

16. The apparatus of claim 4 where the serializer has an electrical output.

17. The apparatus of claim 5 where the control logic uses a state machine.

18. The apparatus of claim 5 where the memory holding the high bandwidth parallel datastream is organized as a first-in-first-out memory.

19. The apparatus of claim 18 where the memory holding the extra packet for the low-bandwidth channel is a portion of the first-in-first-out memory.

20. The apparatus of claim 5 where the serializer has an optical output.

21. The apparatus of claim 5 where the serializer has an electrical output.

* * * * *